United States Patent [19]
Matsuno et al.

[11] Patent Number: 4,757,681
[45] Date of Patent: Jul. 19, 1988

[54] LINK PLATE

[75] Inventors: Kazumasa Matsuno; Takashi Tsujimoto; Takerou Nakagawa; Yasumasa Tubakimoto; Makoto Kanehira, all of Osaka, Japan

[73] Assignee: Tsubakimoto Chain Co., Japan

[21] Appl. No.: 63,786

[22] Filed: Jun. 18, 1987

Related U.S. Application Data
[63] Continuation of Ser. No. 838,798, Mar. 12, 1986, abandoned.

[30] Foreign Application Priority Data

Mar. 13, 1985 [JP] Japan .................. 60-49778

[51] Int. Cl.⁴ .................. F16G 15/12; G05G 1/00
[52] U.S. Cl. .................. 59/84; 59/83; 59/35.1; 59/5; 74/581
[58] Field of Search .................. 59/78, 83, 84, 90, 92, 59/93, 26, 35.1, 5; 112/417; 74/581

[56] References Cited

U.S. PATENT DOCUMENTS

| | | | |
|---|---|---|---|
| 540,498 | 6/1895 | Klatte | 59/84 |
| 636,157 | 10/1899 | Masion et al. | 59/26 |
| 3,153,898 | 10/1964 | Gerhardt | 59/84 |
| 3,434,373 | 3/1969 | Ditlinger | 74/581 |
| 3,733,811 | 5/1973 | Florjancic | 59/84 |
| 4,552,035 | 11/1985 | Skipper | 74/581 |

FOREIGN PATENT DOCUMENTS
445701 11/1912 France .................. 59/84

Primary Examiner—David Jones
Attorney, Agent, or Firm—Stevens, Davis, Miller & Mosher

[57] ABSTRACT

This invention relates to a chain link plate which is constructed by a high tensile strength fiber which is wound around between two pivot points and which is fixed to each other by adhesive material. The link plate is improved in strength and decreased in weight.

6 Claims, 8 Drawing Sheets

LINK PLATE

This application is a continuation, of application Ser. No. 838,798, filed Mar. 12, 1986, now abandoned.

BACKGROUND OF THE INVENTION

1. Field of The Invention

This invention relates to a new and useful link plate for use in high speed drive chain and/ or in heavy duty chains.

2. Description of The Prior Art

A link plate for a chain has conventionally consisted of a punched part in a steel plate, forged part or the like, also at times, a link plate has consisted of fibrous reinforced plastics for weight reduction of the chain.

As such a link plate consisting of fibrous reinforced plastics, two types of link plates have been known. One is such that the link plate is formed by punching in a plate made from fibrous reinforced plastics. The other is such that the link plate is formed by molding with resin mixed with fiberglass, potassium carbonate or the like, which is called "Premixed molding method".

Such a link plate made from metal, however can be produced relatively cheaply, the impact at the time of engagement with sprocket teeth grows larger because of the heavy weight thereof. Therefore such a chain is used when restricted to low speed driving. On the other hand, the link plate punched in a plastic plate cannot sustain the circular stress around a hole where a chain pin and bushing are press-fitted, because the fibers arranged crossways are cut by said punching, resulting in the decreasing of the press-fitting strength between the link plate and the pin or the bushing. As for a link plate by "Premixed molding method", since the fibers which are included in the resin are relatively short of about 12-25 mm, the inclusion content of fibers is less than 33%, and also the directions of the fibers is irregular, the a link plate is inferior in point of strength, so such the link plate should only be adopted for driving chains used in light duty.

STATEMENT OF OBJECTS

The object of this invention is to provide a link plate for a chain which is superior in strength and lightness and which is useable to drive at a high speed and/ or under heavy duty conditions. These and other objects of the invention will become more apparent in the detailed description and examples which follow.

BRIEF DESCRIPTION OF THE DRAWINGS

FIGS. 12 (a) through 12(d) are schematic plan views disclosing a method of producing the link plate in FIG. 11;

FIGS. 14 (a) through 14(d) are schematic plan views disclosing a method for producing the link plate in FIG. 13;

FIGS. 16 (a) through 16(d) are schematic plan views disclosing a method for producing the link plate in FIG. 15;

DETAILED DESCRIPTION

Figure 1:
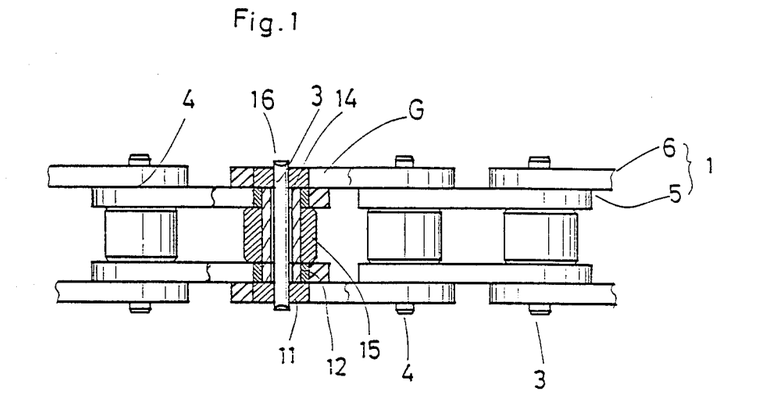
FIG. 1 is a top view disclosing a chain assembled by pairs of link plates of this invention.
Figure 2:
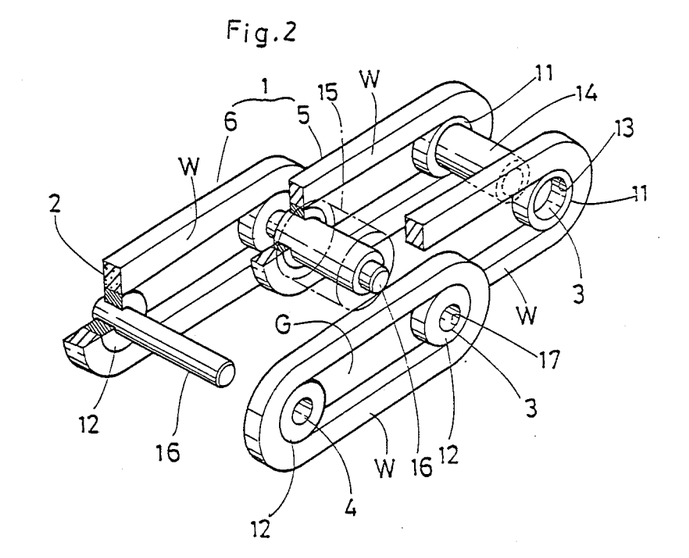
FIG. 2 is a perspective view of a chain in FIG. 1.

Referring to FIG. 1 and FIG. 2, there is shown a portion of a partially assembled chain comprising a plurality of adjacent link plates 1 . . .

The link plate 1 is constructed by a high tensile strength fiber 2 which is wound around between two pivot points 3,4 and which is fixed to each other by adhesive material. Said fiber 2 is aromatic polyamide fiber so-called Aramid fiber, carbon fiber, alminizing fiber or the like which has a tensile strength strength of about 200–500 kg/mm$^2$ or other sorts of fiber which has a higher tensile strength than that may be adopted. The mixed ones comprising some kinds of fiber are also available as said fiber 1. As for the adhesive material, a thermosetting resin so called polyester resin, an epoxy resin or a phenolic resin may be adopted and epoxy resin is more suitable for use from the view point of strength. And also, molten metal which is melt-processable under a comparatively low temerature such as a leadbase alloy or solder is available.

The fiber 2 is wound around between two pivot points 3.4 and the chain includes inner link plates 5,5 and outer link plates 6,6, furthermore a chain is assembled as roller chains in the embodiment. The said pivot points 3,4 are pivotally connected points of the chain, thus the distance between these pivot points 3,4 shows the pitch length of the chain.

In accordance with this embodiment, at the pivot points 3,4 are there provided with circular portions formed by cylindrical support rings 11,11,12,12 and the fiber 2 is wound around outer surfaces of support rings 11,11 or 12,12, spanning the two pivot points 3,4. The fiber 2 is wound several times till the fiber 2 forms a winding construction which includes wall portion W of a rectangular-shaped section. And also, the fiber 2 and the support rings 11,11 or 12,12 fixed each other by means of said adhesive material form inner link plates 5,5 and outer link plate 6,6 respectively. And the winding construction is provided with an open portion G between support rings 11,11 or 12,12. The opposite inner link plates 5,5 are interconnected by a pair of pin members forming bushings 14,14 press-fitted into opposite holes 13,13 of the support rings 11,11. Around the bushing 14 is mounted a roller 15 in idling relationship. Outer link plates 6,6 are interconnected by a pair of pin members forming chain pins 16,16 which pass through the bushing 14 and which are press-fitted into opposite holes 17,17 of the support ring 12,12. As a result, a roller chain comprising the inner link plates 5 . . . , the outer link plates 6 ..., the bushing 14 ... the chain pins 16 ... and the rollers 15 ... is assembled.

Figure 3:
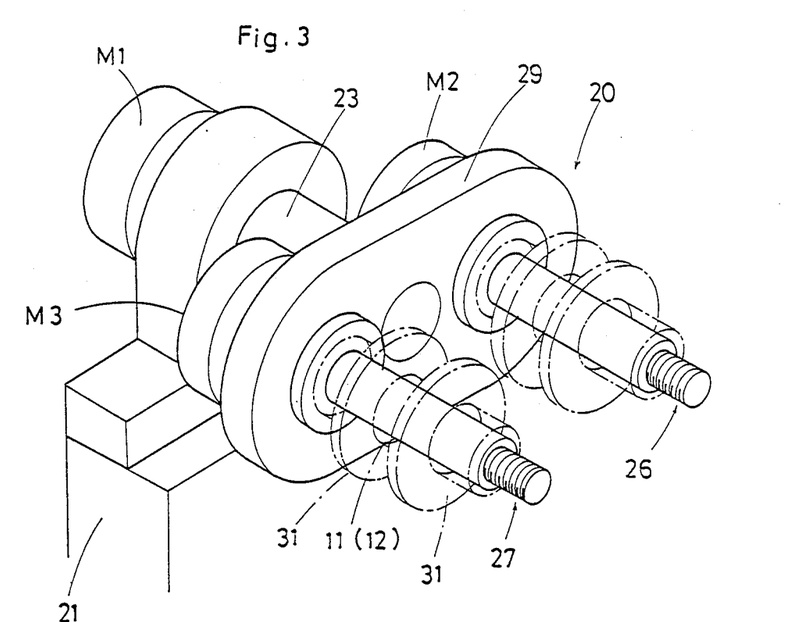
FIG. 3 is a perspective view illustrating a winding device for the link plate.
Figure 4:
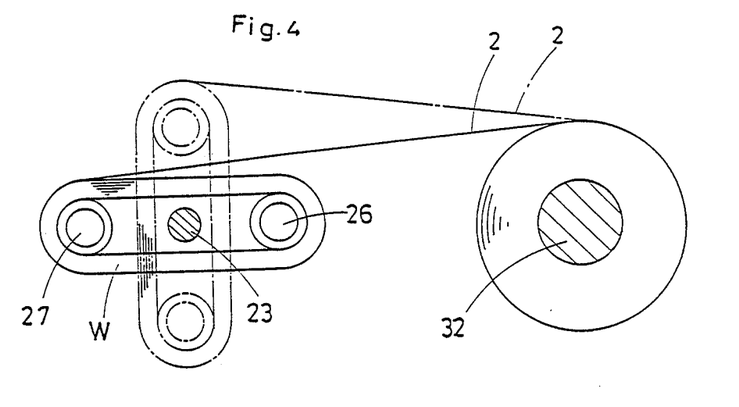
FIG. 4 is a elevational plan view disclosing a method for producing the link plate with the winding device in FIG. 3.

A winding device 20 as shown in FIG. 3 can be used to produce said link plate 1. The winding device 20 is provided with a shaft 23 rotatably supported by a journal on the base block 21 and driven by a suitable mover such as mover M1 with brake device. And on the outer end of the shaft 23 is mounted a bracket 29, which projects winding shafts 26, 27 at the intervals of same distance as the chain pitch length, as measured between the centers of said winding shafts 26,27. The winding shafts 26,27 are connected to motors M2,M3 with brake device, and the outer ends of the winding shafts 26,27 comprise a screw threaded portion. The winding device 20 may be used for producing the link plate 1 as shown in FIGS. 1 and 2 as well as other forms of link plate 1 as shown in FIGS. 9,11,13,15. In case of producing the link plate 1 as shown in FIGS. 1,2, flanges 31,31 which hold the support rings 11 or 12 therebetween are retained onto the winding shafts 26,27 with nuts and collars as just described in FIG. 3 by chain lines. After the end portion of the fiber 2 stored onto the bobbin 32 is fixed onto the support ring 11or 12, the motor M1 is driven to turn the bracket 29. The fiber 2 is wound around between support rings 12,12 or 13,13 to form said link plate 1 having a wall portion W of a rectangle-shaped section, which consists of plural layers of said fiber 2 and which is of the same width as the support rings 11,12. And then the fiber 2 is fixed to each other by adhesive material. The adhesive material can be coated on the fiber 2 in advance winding, or can be vacuum-impregnated in such as an Autoclave after winding. The green construction becomes the chain link plate 1 by heat - hardening of adhesive material. Also it is possible to wind the fiber 2 during impregnating. In the case of adopting molten metal, it is possible to impregnate with molten metal after winding or to coat with molten metal during winding. At the same time as finishing the winding of the fiber 2, molten metal is made hard by cooling to fix the fiber 2 to each other.

Figure 5:
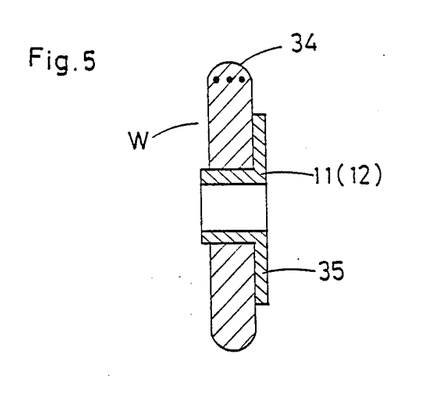
FIG. 5 is a cross-sectional view of another form of a link plate.
Figure 6:
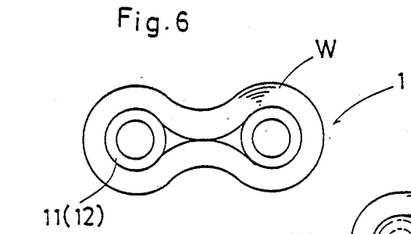
FIGS. 6 through 8 are elevational views of modified forms of the link plate in FIG. 2.
Figure 7:
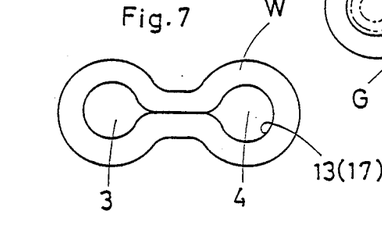
Figure 8:
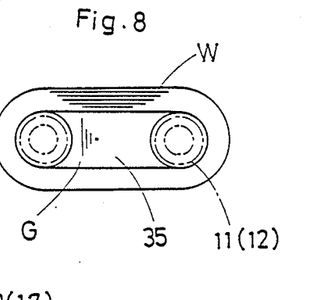

The link plate 1 may be wound so that the outer-periphery 34 of the wall portion W is in the shape of a semi-circle and also support rings 11,12 are formed to have a flange portion 35 at the side thereof as shown in FIG. 5. FIG. 6 shows the link plate 1 which is hardened after curving the wall portions W inwardly. FIG. 7 shows the link plate 1 which includes a circular portion around the pivot points 3,4 instead of the support rings 11,12. In this case, it is suitable to form a liner layer of synthetic resin or the like with along the hole surfaces 13,17. FIG. 8 shows the link plate 1 which is equipped with a shield portion 35 at the empty portion G between the support rings 11,11 or 12,12. In this case, the support rings 11,12 can be set by the shield portion 35.

Figure 9:
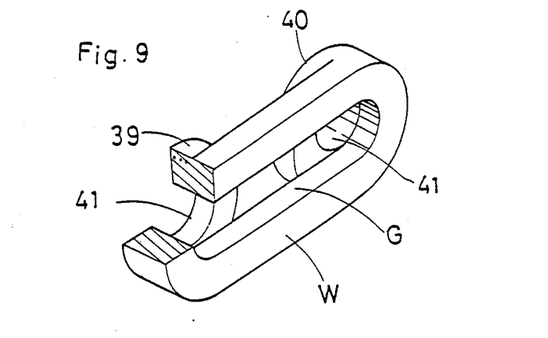
FIG. 9 is a perspective view of another form of a link plate.

FIG. 9 shows another embodiment of the invention in which the link plate 1 includes circular portions formed by the boss portions 39,40 which are concentrically connected with the pitch point 3,4 on one side of the oval wall portion W. In accordance with this embodiment, the inner surface of semi-circular portion placed at both ends of the open portion G is of the same diameter as the hole 41,41 of the boss portions 39,40. So, the inner surface of the semi-circular portion and the inner surface of the hole 41 are arranged in alignment with each other. Also this link plate 1 can be produced in said winding device 20.

Figure 10A:
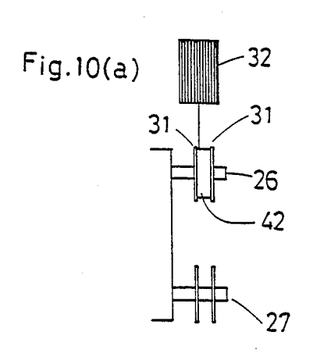
FIGS. 10(a) through 10(d) are schematic plan views disclosing a method for producing the link plate in FIG. 9.
Figure 10B:
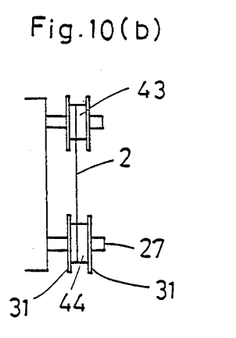
Figure 10C:
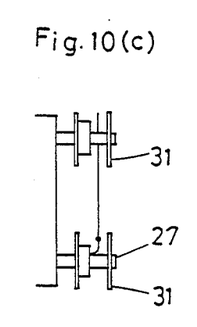
Figure 10D:
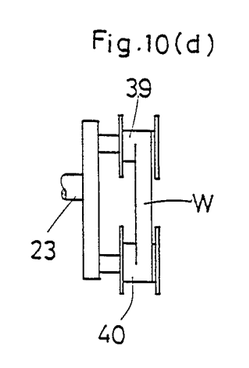

As shown in FIG. 10(a), after setting the flanges 31,31 oppositely onto the winding shaft 26,27 at intervals of the same distance as the width of the boss portions 39,40, a winding construction 42 is formed by the fiber 2 of which the length is long enough to form both the boss portions 39 and 40. And then, the winding constructions 43,44 which are same dimension in thickness and diameter are produced by rewinding the half length of the fiber 2 from the said winding construction 42, as shown in FIG. 10(b). And as shown in FIG. 10(c), after shifting the flange 31 a distance as equal to the thickness of the wall portion W, the end portion of the fiber 2 from the winding shaft 27 is connected to the fiber 2 from the bobbin 32. Accordingly, as shown in FIG. 10(d), by turning the shaft 23,the wall portion W is formed, and the link plate 1 as shown in FIG. 9 can be produced by fixing the fiber 2 to each other by said adhesive material.

Figure 11:
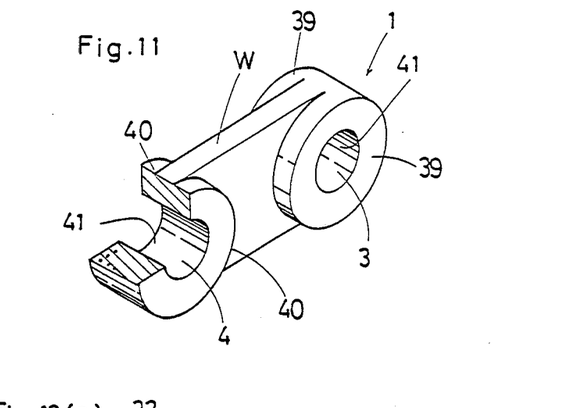
FIG. 11 is a perspective view of another form of a link plate.
Figure 12A:
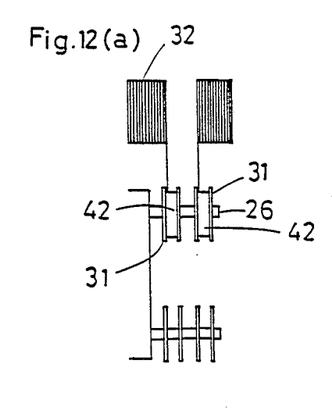
Figure 12B:
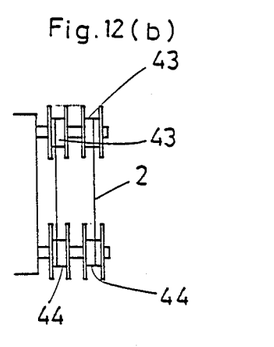
Figure 12C:
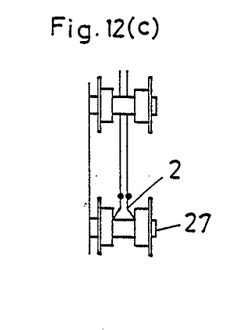
Figure 12D:
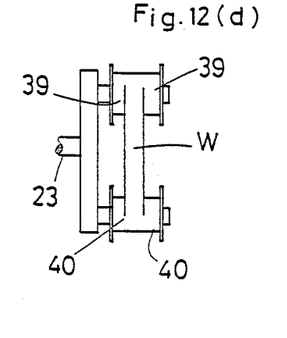

FIG. 11 shows another embodiment of the link plate 1 which includes the boss portions 39,39,40,40 which are concentrically connected with the pitch point 3,4 onto both sides of the wall portion W. As shown in FIG. 12(a), after two pairs of the flanges 31,31, each flanges 31,31 in a pair being opposed to each other at intervals of the same distance as thickness of the boss portion 39 or 40, are set onto the respective winding shafts 26,27 at intervals of the same distance as thickness of the wall portion W, the winding device 20 is operated and the winding construction 42,42 are formed onto the winding shaft 26. And then, the winding constructions 43,43,44,44 can be formed by turning back the half length of the fiber 2 from the winding construction 42, and the flanges 31,31 placed inside are removed. The flange 31 is easily removable. And after fixing the end portion of the fiber 2 from the winding shaft 27 to the fiber 2 from the bobbin 32,as shown in FIG. 12(c); the shaft 23 is turned, as shown in FIG. 12(d), the link plate 1 as shown in FIG. 11 can be produced.

Figure 13:
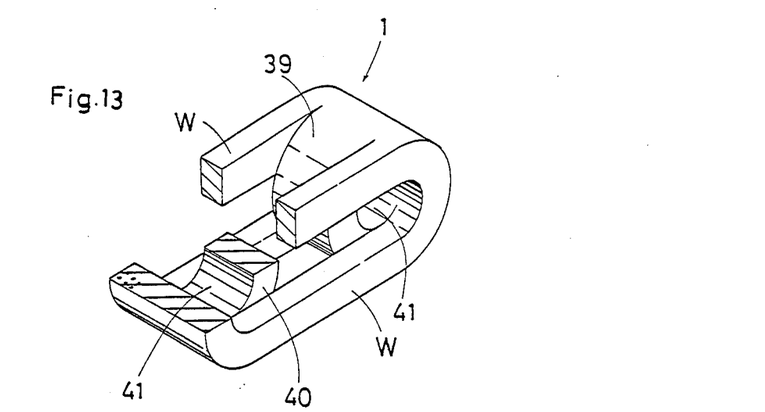
FIG. 13 is a perspective view of another form of a link plate.
Figure 14A:
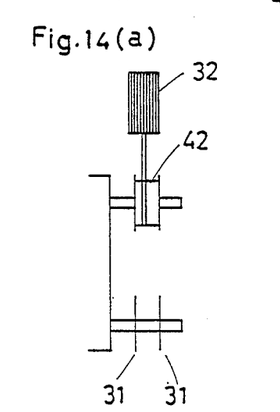
Figure 14B:
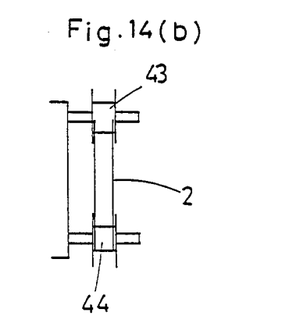
Figure 14C:
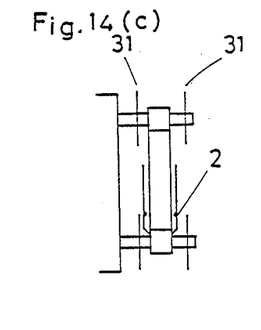
Figure 14D:
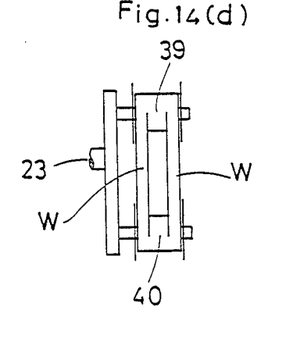

FIG. 13 shows the link plate 1 for use in a block chain, which include wall portions W,W on both sides of the boss portions 39,40. As shown in FIGS. 14(a) through (d), in the same way, after forming the winding constructions 43,44, the flange 31 is shifted a distance equal to the thickness of the wall portion W, and then the wall portions W,W are formed at said shifted position.

Figure 15:
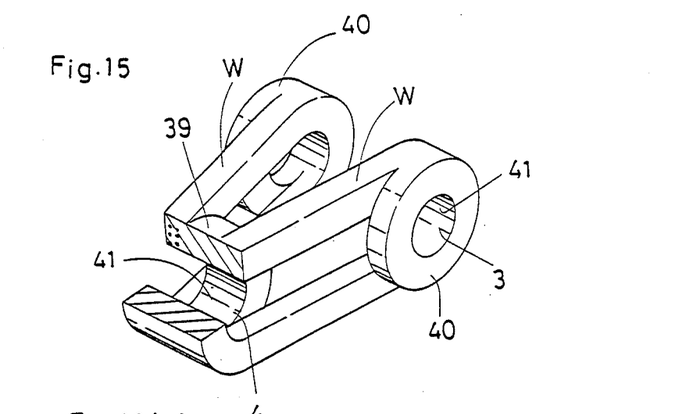
FIG. 15 is a perspective view another form of a link plate.
Figure 16A:
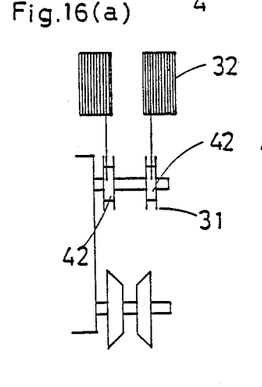
Figure 16B:
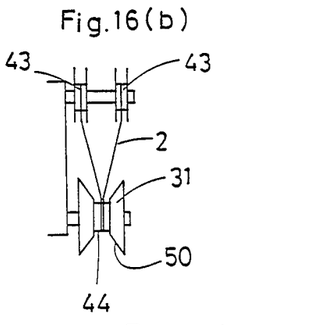
Figure 16C:
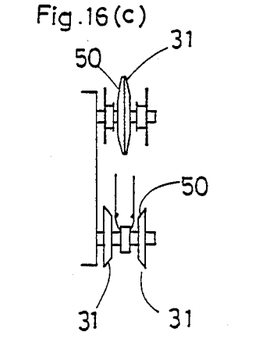
Figure 16D:
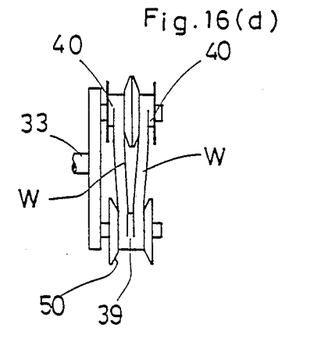

FIG. 15 shows another embodiment of the invention in which the link plate 1 for a pintle chains is disclosed. The link plate 1 includes a boss portion 39 at the pitch pivot 4 and two boss portions 40 ,40 concentrically arranged at the pitch pivot 3 on the outside surface of the outwardly inclined wall portions W,W. And also the thickness at the pitch pivot 4 is selected to be the same distance as the gap between wall portions W,W at the pitch pivot 3, so that the link plates 1 ,1 can be connected by overlapping the pitch pivot 3 and the pivot point 4 alternately. And also the link plate 1 is produced by the method as shown in FIGS. 16(a) through 16(d). After forming the winding constructions 43,43,44 as shown in FIGS. 16(a) through(b), the oval and inclined wall portions W,W are formed at the position where the flanges 31 ... are shifted away. In this function ,it is better to form the tapered surface 50 on both sides of the flanges 31 ... to prevent the fiber 2 from being rubbed.

Figure 17:
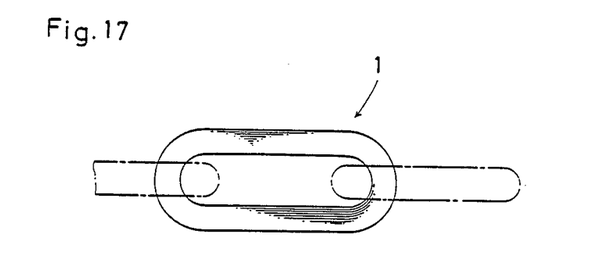
FIGS. 17 through 19 are elevational views of still other forms of link plates.

FIG. 17 shows another form of link plate 1 for a short link chain. The link plate is formed by a winding construction of a circle-shaped section.

Figure 18:
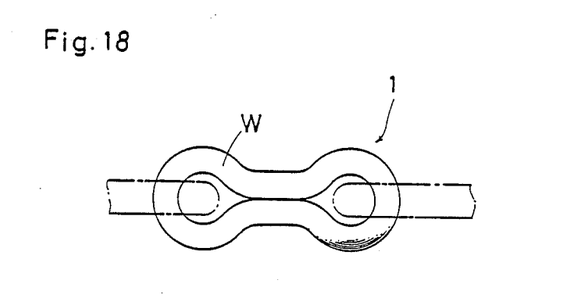

FIG. 18 shows another form of link plate 1 in FIG. 17 of which wall portion W is curved inwardly to prevent the link plates 1 ... from getting entangled with each other.

Figure 19:
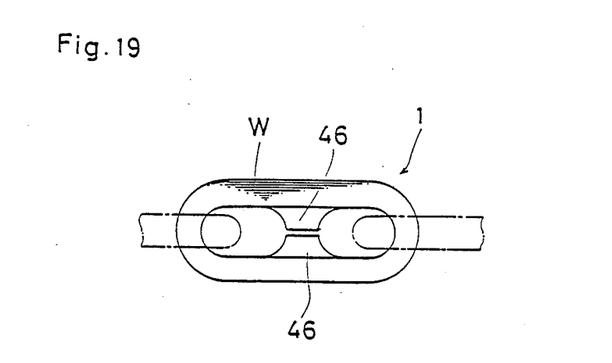

FIG. 19 shows another form of the link plate 1 as in FIG. 17 which forms protruding portions 46,46 made of synthetic resin on the opposite inner surfaces of the wall portion W to prevent the link plates 1 ... from getting entangled with each other.

The link plate 1 shown in FIGS. 9,11,13,15 include the boss portion 39,40 which are formed by the fiber 2 wound around the hole 41. Therefore, the fiber 2 forming the boss portions 39,40 can sustain the stress caused by the bushing 14 or the chain pin 16 press-fitted into hole 41. So the chain can be improved in strength. And it is possible to provide with the support ring 11,12 at the hole 41 ... by press-fitting, adhesion or the like in order to increase the strength for press-fitting. And also it is possible to wind a plurality of the fibers 2 ... at the same time in order to improve the winding efficiency, but in this case, each tension of the fibers 2 ... should be kept evenly.

EFFECT OF THE INVENTION

As explained in the above detailed description, the link plate is constructed by high tensile strength fiber which is wound around between two pitch points and which is fixed to each other by adhesive material. This link plate is useful to reduce the weight of a chain and to decrease the centrifugal force in high speed driving, enabling to be adopted for use in high speed driving and/or in heavy duty. So that the strength of the link plate of this invention is superior to that of a link plate made from fibrous reinforced plastics, and also if the link plate of this invention has the same strength as the link plate made from fibrous reinforced plastics, the link plate of this invention can be reduced in weight. If the link plate having the boss portions which are formed by wound fibers around each pitch pivot, the tensile strength is increased enough to sustain the circular stress caused by press-fitting of a chain pin or a bushing. As a result, the link plate having the bosses is superior in strength.

As many apparently different embodiments of this invention may be made without departing from the spirit and scope thereof, it is to be understood that the invention is not limited to the specific embodiments thereof expect as defined in the appended claim.

We claim:

1. A link plate for a chain having a plurality of link plates interconnected by a plurality of cross pin members for pivotally connecting together two said link plates at pivot points located at each end thereof, said link plate comprising an elongated body of high tensile strength fiber material with a circular bearing portion lying at each end for receiving in bearing contact said cross pin members at said pivot points, said circular bearing portions comprising a winding of high tensile strength fiber material circularly wound around said pivot points and, said elongated body comprising a plurality of turns of high tensile strength fiber material wound around both pivot points and extending between said two circular bearing portions, said turns being fixed to each other by adhesive material.

2. A link plate as claimed in claim 1, wherein said fiber has tensile strength of about 200-500 kg/mm$^2$.

3. A link plate as claimed in claim 2, wherein said fiber is aromatic polyamide fiber.

4. A link plate as claimed in claim 1, wherein said adhesive material is thermosetting resin.

5. A link plate as claimed in claim 4, wherein said adhesive material is epoxy resin.

6. A link plate for a chain having a plurality of such link plates to interconnect a plurality of spaced apart cross pin members, said link plate comprising an elongate body having a circular bearing portion at each end, each said circular bearing portion comprising only a high tensile strength fiber having a plurality of turns wound circularly about an opening for bearing contact with a pin member;

said elongated body between said circular bearing portions comprising only high tensile strength fibers wound with a plurality of turns to form two parallel legs extending between said circular bearing portions;

said high tensile strength fibers of both the circular portions and the body being fixed together by an adhesive material to form an integral body.

* * * * *